Feb. 21, 1928.
A. J. LARCHER
1,660,171
COUNTERWEIGHTED CRANK SHAFT AND METHOD OF MAKING SAME
Filed Feb. 28, 1921
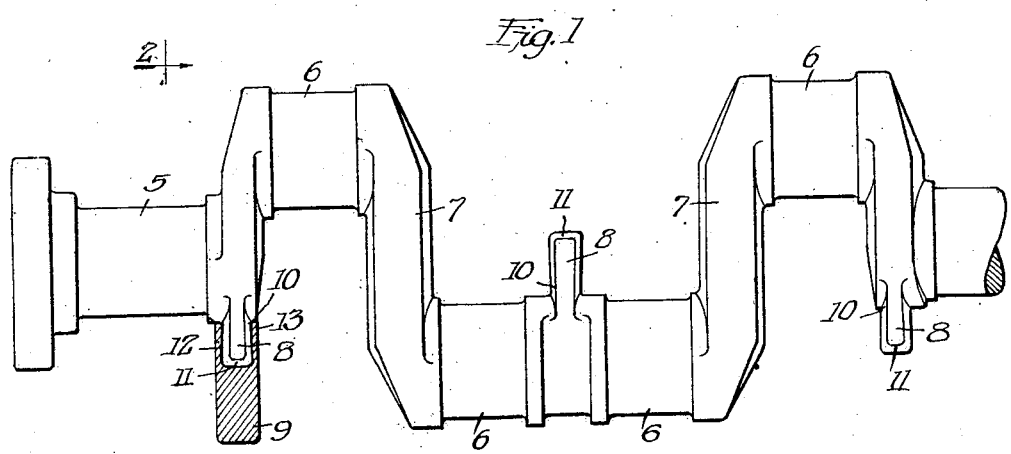
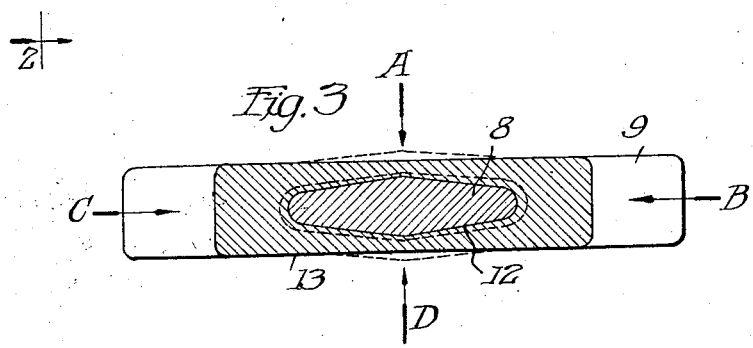
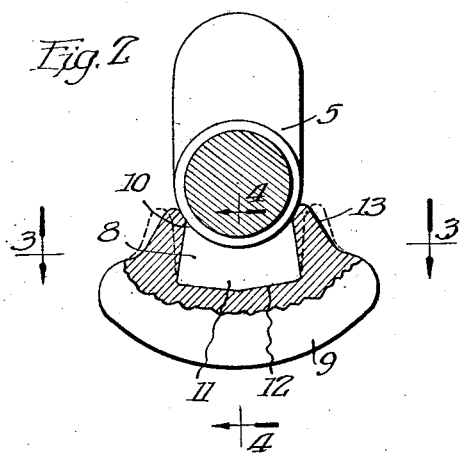
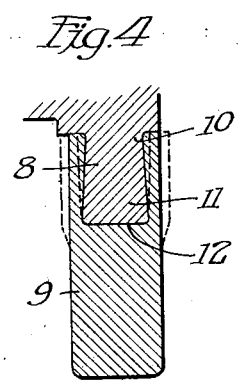
Inventor:
Albert J. Larcher,
By Fisher, Towle, Clapp & Evans
attys.

Patented Feb. 21, 1928.

1,660,171

UNITED STATES PATENT OFFICE.

ALBERT J. LARCHER, OF HARVEY, ILLINOIS, ASSIGNOR TO WYMAN-GORDON CO., OF WORCESTER, MASSACHUSETTS, A CORPORATION OF MASSACHUSETTS.

COUNTERWEIGHTED CRANK SHAFT AND METHOD OF MAKING SAME.

Application filed February 28, 1921. Serial No. 448,352.

This invention relates to crank shafts but more particularly to such as are provided with counterweights to secure the proper running balance, and has for its primary object to provide a new and improved counterweight construction and method of attaching the same to the crank shaft which insures permanency and rigidity of the connection.

Another important object of the invention is to eliminate the necessity for welding the counterweight upon the crank shaft.

Further objects of the invention are to utilize the shrinkage of the counterweight in cooling to provide a binding engagement between the counterweight and the crank shaft, and to insure that the travel of the counterweight shall be in the line of revolution of the crank shaft and at a right angle to the axis of the shaft.

The many other features and advantages of the present invention will be better understood by reference to the following specification when considered in connection with the accompanying drawing illustrating a selected embodiment thereof, in which:—

Fig. 1 is an elevation of a crank shaft embodying the present invention.

Fig. 2 is a section on the line 2—2 of Fig. 1.

Fig. 3 is an enlarged section on the line 3—3 of Fig. 2, and

Fig. 4 is an enlarged section on the line 4—4 of Fig. 2.

Referring to the drawing, the crank shaft 5 is composed of the usual pins 6 and crank arms or cheeks 7. This particular crank shaft is designed for a four-cylinder engine, but the present invention is equally applicable to any form of crank shaft in which counterweights are used to procure the proper balance.

The crank shaft 5 is provided with laterally projecting lugs 8 formed thereon or otherwise secured thereto and properly positioned to receive the counterweights 9. All laterally projecting faces of the lugs 8 are preferably inclined outwardly from the base 10 of the lug so that the outer extremity 11 of the lug is uniformly larger in cross-section than the base.

The counterweight 9 may be of any suitable form or shape and is provided with a socket 12 in the base thereof to receive the lug 8 on the crank shaft. This socket is preferably substantially uniform in cross-section or slightly larger at its mouth than at its bottom in order that the counterweight may be readily placed upon the lug. The base of the socket should preferably fit the outer end of the lug. The form of the counterweight when placed upon the lug is indicated in dotted lines in Figs. 2 to 4 of the drawing.

The counterweight is preferably heated to the proper temperature and placed upon the lug in this heated condition. The crank shaft is preferably not heated. The neck portion 13 of the counterweight is now subjected to pressure preferably on its four sides in the directions indicated by arrows A, B, C and D in Fig. 3 of the drawing. This causes the neck to be uniformly contracted and the walls of the socket brought into firm contact with the opposing faces of the lug. The subsequent shrinkage of the counterweight in cooling causes the same to uniformly contract and to greatly increase the pressure or grip of the counterweight upon the lug. This uniform shrinkage of the counterweight over the entire lug is due primarily to the formation of the socket which envelops the lug on all sides and therefore will not permit any warping action of the opposing walls of the socket during the contraction as would be most likely to occur if the counterweight engaged the lug on two sides.

The initial contracting of the neck of the hot counterweight may be accomplished in various ways but I have found it advantageous to utilize a pair of oppositely disposed dies, each exerting a pressure on two adjoining sides. For example, one die would exert a pressure in the direction of arrows A and B and the other die in the direction of the arrows C and D in Fig. 3. As the particular construction and mode of operation of these dies form no part of the present invention it is not believed that any further description of the same is necessary. The shaft, being cold when the hot counterweight is pressed thereon, does not subsequently shrink, and the shrinkage of the counterweight in cooling therefore contracts the socket relative to the lug and produces a degree of binding engagement which could not be obtained by external pressure.

The engagement of the lug on all of its sides or laterally projecting faces by the counterweight rigidly positions the latter upon the crank shaft and prevents any possibility of the counterweight becoming out of alignment or loose upon the crank shaft. When the counterweight has cooled it cannot be removed from the crank shaft without a complete fracture of the metal and the enormous pressure produced by the shrinkage forms an interengagement which is fully as substantial and rigid as though the two parts were united by welding.

I am aware that many changes may be made in the form and disposition of the various parts without departing from the spirit of my invention and I reserve the right to make all such as fairly fall within the terms of the following claims.

I claim:

1. In a counterbalanced crank shaft, the combination of a crank shaft having an outwardly flaring lug projecting laterally therefrom, and a counterweight provided with a socket having a continuous side wall fitting about said flaring lug to form an interlocking connection for rigidly holding said counterweight against displacement.

2. In a counterbalanced crank shaft, the combination of a crank shaft provided with a laterally projecting lug having a constricted portion, and a counterweight provided with a socket having a continuous side wall enveloping said lug and having the walls thereof contracted to fit the constricted portion of said lug to form an interlocking engagement between said shaft and said counterweight.

3. The method of making counterbalanced crank shafts which consists in forming the crank shaft with a projecting lug having a contracted portion, forming the counterweight with a continuous walled socket to receive the lug on the crank shaft, and shrinking the counterweight upon said lug to interlock the wall of the counterweight with the contracted portion of the lug.

4. The method of making counterweighted crank shafts which consists in forming the crank shaft with a projecting lug having a contracted portion, forming the counterweight with a continuous walled socket therein to receive said lug, placing the counterweight in a heated condition upon the unheated lug on said crank shaft, and compressing the heated counterweight to cause the walls of said socket to snugly fit and interlock with said lug.

5. A counterbalanced crank shaft provided with an integral projecting lug having a contracted portion and a counterweight provided with a socket having a continuous wall shrunk upon said lug and interlocked with the contracted portion thereof to rigidly hold the counterweight against displacement.

ALBERT J. LARCHER.